United States Patent Office 3,287,389
Patented Nov. 22, 1966

3,287,389
COMPLEXES OF SO₃ WITH NITRILES, METHOD OF PREPARATION THEREOF AND METHOD OF SULFONATION OR SULFATION THEREWITH
George L. Broussalian, Overland, Mo., assignor to Monsanto Company, a corporation of Delaware
No Drawing. Filed Sept. 14, 1962, Ser. No. 223,838
18 Claims. (Cl. 260—458)

The present invention relates to novel compositions that can be advantageously utilized in processes which involve the sulfonation and sulfation of organic compounds with sulfur trioxide. More particularly, this invention relates to the manufacture and use of novel complexes of sulfur trioxide with cyanide (or nitrile) compounds.

Processes for the sulfation and/or sulfonation with sulfur trioxide of a wide variety of organic compounds are well known in the chemical art. Almost as widely appreciated is the fact that, as a general rule, special precautions must be observed during the sulfonation or sulfation of organic materials with $SO_3$ in order to minimize charring and/or other degradation of the organic material, due to the uncontrolled reaction of $SO_3$ with the organic material that sometimes occurs. For this reason, there has existed a need for a new and better method for sulfonating and/or sulfating organic materials with $SO_3$.

Consequently, it is an object of this invention to provide novel complexes of sulfur trioxide with either organic cyanide (or nitrile) compounds or HCN and its halide derivatives.

It is another object of the present invention to provide processes for the manufacture of these novel $SO_3$-nitrile complexes.

It is still another object of the present invention to provide methods for the advantageous utilization of these novel $SO_3$-nitrile complexes.

It is another object of this invention to provide novel processes for sulfonating aromatic compounds.

It is still another object of this invention to provide novel processes for sulfating alcohols.

The above, as well as other objects of the present invention which will become apparent from the following discussion of the complexes and processes of the invention. Processes for the manufacture of the sulfur trioxide-nitrile complexes of this invention comprise the step of intermixing sulfur trioxide with the particular cyanide or nitrile compounds at a temperature substantially below ambient temperatures (i.e., sufficiently low to permit the formation of the complex without excessive degradation reaction of the $SO_3$ with the cyanide compound). Processes for using the complexes of this invention comprise the step of physically contacting a sulfonatable or a sulfatable organic material with the complex at a very low temperature.

The sulfur trioxide cyanide complexes of this invention can be manufactured by intermixing sulfur trioxide with HCN, for example, or with any organic nitrile compound that can be manufactured and that does not contain functional groups that can react deleteriously with $SO_3$ at temperatures below about —5° C. The nitrile portion of the complexes of this invention generally serve only as a carrier for the sulfur trioxide and as will be seen from the description of procedures of sulfonation which follows, the sulfur trioxide can be recovered from the complex in chemically unmodified form at temperatures below —5° C. In view of this, the radical attached to the nitrile group of the nitrile suitably can be a hydrocarbon radical of from one to fifteen carbon atoms selected from the group consisting of saturated and monoethylenically unsaturated aliphatic radicals, alicyclic radicals, monocyclic aryl radicals and aralkyl radicals. Still further preferred are those that contain from 1 to 10 carbon atoms and in which the radical attached to the nitrile group is alkyl in nature. Typical, but non-limiting, examples of some of the nitrile (or cyanide) compounds that can be used in the processes of this invention include acetonitrile, acrylonitrile, propionitrile, benzonitrile, trimethylacetonitrile, isovaleronitrile, isocapronitrile, 2-tolunitrile, benzyl cyanide, 1,4-dicyanobutane, heptamethylenedicyanide, mandelonitrile, 2-cyanopyridine, t-butylacetonitrile, fumaronitrile, cyanocyclohexane, cyanocyclopentane, and butyronitrile. Since the nitrile portion of the complexes of this invention generally serve only as a carrier and modifier for the $SO_3$, it is generally preferred, for optimum efficiency, that the very low molecular weight nitriles such as acetonitrile, propionitrile, butyronitrile and other lower alkyl nitriles, particularly acetonitrile, be utilized in the practice of the invention.

Practically any source of sulfur trioxide for use in processes for manufacturing the $SO_3$-nitrile complexes (or addition products) of the present invention can be utilized. For example, relatively pure $SO_3$ can be utilized, if desired, in the liquid, solid or gaseous state, although generally gaseous $SO_3$ is preferred. Since $SO_3$ alone is an extremely powerful agent, it can sometimes be utilized to advantage in a relatively dilute form, for example, as a mixture or blend with liquid or gaseous sulfur dioxide or with dry air, and it can even be used as very concentrated (fuming) sulfuric acid or oleum.

Any manipulative procedure for contacting one of the aforementioned nitrile compounds with sulfur trioxide can be utilized in the processes for manufacturing the $SO_3$-nitrile complexes of this invention. For example, $SO_3$ can be introduced as a gas into preferably a cold fluid mass of either the nitrile alone (if it is a nitrile such as, for example, acetonitrile, benzonitrile and propionitrile, which remains in the liquid or fluid state at the complex-forming temperature) or to the nitrile dissolved in a solvent which is fluid at temperatures below about —5° C. and is ordinarily inert to $SO_3$ at such low temperatures, as well. If desired, $SO_3$ in the liquid or solid form can simply be blended into a cold solution of the nitrile in an inert solvent. Thus, the desired $SO_3$-nitrile complex can be formed as the $SO_3$ dissolves in the solvent system, and generally gradually precipitates from the solvent system in the form of white crystals. The crystals can then be isolated from such a system by filtration. Continuous as well as batch processes for manufacturing the $SO_3$-nitrile complexes can be utilized. One such continuous process involves the gradual introduction of gaseous $SO_3$ diluted with dry air into the bottom of a reaction vessel in which a cold (below about —5° C. and preferably below about —15° C.) solution of the nitrile in an inert (to $SO_3$) solvent is being stirred. Introduction of the $SO_3$ results in the gradual formation of crystals of a complex of the nitrile with the $SO_3$. Part of the nitrile-solvent-complex system is continuously withdrawn from the reaction vessel and passed through a suitable (for example, stainless steel) collector (filter) screen, upon which the complex crystals are trapped. The filtrate is then recirculated back into the mixing vessel. Fresh nitrile can be added continuously or periodically to the solvent system as desired.

Suitable solvents for use in processes for manufacturing the $SO_3$-nitrile complexes of this invention include carbon tetrachloride, n-hexane, ethylene dichloride, petroleum ether, cyclohexane, chloroform, dichloromethane, tetrachlorethane, chlorobenzene, trichlorobromomethane, pentane, heptane, naphtha, bromobenzene, nitrobenzene, 1,2-dichloropropane, hexachloroethane, liquid sulfur dioxide, skelly solve, gasoline, dimethyl sulfoxide and the like. Note that, of these solvents, generally those that are non-polar are preferred.

It must be emphasized that, for optimum results in the practice of this invention, the temperature of the novel $SO_3$-nitrile complexes, as well as the "raw" materials during processes for preparation of the complexes must be maintained at all times below that point at which the complexes spontaneously degrade and inter-react (to form, among other things, sulfamides or sulfamide inner anhydride compounds). For this reason, it is generally preferred to carry out the processes for the manufacture of these complexes at reaction temperatures below about $-15°$ C., and still further preferred, below about $-20°$ C. The complexes, themselves, should be kept at similarly low temperatures in order to avoid the undesirable inter-reactions mentioned above. Also, processes for the use of the complexes should be carried out at similarly low temperatures.

The $SO_3$-nitrile complexes of this invention can be utilized for the sulfonation of any sulfonatable organic compound which is otherwise at least fairly stable to sulfur trioxide at temperatures of about $0°$ C. or lower. Thus, any material that can be sulfonated conventionally can be sulfonated according to the improved sulfonation processes of this invention. Similarly, any material that can be sulfated conventionally can be sulfated in the practice of the present invention. An appreciation of the many types of materials that can be sulfonated and sulfated can be gained by a study of the article by Gilbert and Jones in Industrial and Engineering Chemistry, vol. 52, No. 7, pp. 629–634 (1960). Typical, non-limiting, examples of materials that can be sulfonated in accordance wtih the present invention include the olefinically and acetylenically unsaturated hydrocarbons such as decene, propylene, tetradecene, and the like, cyclo-olefins and their alkyl derivatives such as cyclohexene, ethylcyclohexene, dodecylcyclohexene, and the like; heterocyclic compounds such as pyridine, thiopene and the like; esters and ethers such as phenylethenyl ether and the like; as well as aliphatic acids that are unsaturated such as oleic and linolenic acid. Similarly, the present invention is especially advantageous for the sulfonation of alkyl aromatic hydrocarbons, and alkylated phenols such as, for example, dodecylbenzene, ethylbenzene, dinonylphenol, dinonylbenzene, didodecylbenzene, dodecyltoluene, amylnaphthal, amylnaphthalene, nonylnaphthalene, decylphenol, benzene, toluene, xylene, isopropylbenzene, as well as other long- and short-chain substituted mono- and bicyclic aromatic hydrocarbons, phenols, and naphthalenes.

Note that while olefinically unsaturated and acetylenically unsaturated compounds can be reacted with the $SO_3$ portion of the complexes of the present invention to result in the initial formation of a sultone, generally the nitrile portion of the complex then reacts with at least some of the sultone that is formed to yield the corresponding 2-dioxy-1,2,5-oxathiazine compound.

Processes for the sulfonation of organic aromatic compounds such as benzene, and alkylaryl hydrocarbons such as toluene, xylene, and lower and higher alkylbenzenes (particularly those having alkyl groups containing from 10 to 18 carbon atoms), naphthalene, the alkylnapthalenes and the like, wherein the novel $SO_3$-nitrile complexes of the present invention are utilized as the source of at least part of the $SO_3$ for the sulfonation reaction, represent a particularly preferred embodiment of this invention. Similarly, processes wherein these complexes are used for the sulfation of alcoholic compounds represent still another preferred embodiment of this invention. Typical, non-limiting, examples of materials that can be sulfated in accordance with the processes of this invention include such compounds as the phenols and alkylphenols (such as nonylphenol, dodecylphenol, dinonylphenol, and diisopropylphenol), and the aliphatic alcohols, including the fatty acid glycerides (such as laurol, tallow alcohol, isopropanol, ethanol and the glyceride monoesters of lauric acid, oleic acid, and castor oil).

The advantages of this invention are especially evident when it is utilized in the sulfation of lower alkylene oxide (i.e., ethylene oxide, propylene oxide, and butylene oxide) adducts of the alkylphenols, particularly those having alkyl groups containing at least 6, but up to 30 or more carbon atoms in their alkyl group(s).

From the foregoing specific examples, it can be seen that the invention is applicable for the sulfonation and/or sulfation of any organic compound which contains one or more hydrogen atom that is replaceable with the $SO_3H$ group. This includes compounds containing non-interfering groups or substituents such as halide, nitro, keto, carboxyl, and ether groups, and the like as well as the materials mentioned above, themselves. Since a great many of the materials that can be sulfonated or sulfated via the processes of this invention are either solid or viscous liquids at the low temperatures at which the processes of this invention must be practiced, it is generally preferred that these materials be either dissolved or dispersed in a suitable solvent at the time they are brought into contact with the particular $SO_3$-nitrile sulfonating agent that is being utilized. Suitable solvents for the sulfonation or sulfation processes of the invention include all of those that are fairly fluid at the low temperatures described heretofore and which are inert to $SO_3$ at such low temperatures. Typical, non-limiting, examples of suitable solvents for these sulfonation and sulfation processes include carbon tetrachloride, chloroform, bromoform, methylene chloride, methylene bromide, ethyl ether, dioxane, thioxane, furan, dibutyl ether, diphenyl ether, 1,2-dichloroethane, 1,1-dichloroethane, sym. tetrachlorethane, 1,2,3,-trichloroethane, nitromethane, dimethyl sulfone, dimethylsulfoxide, formamide, N,N-dimethylformamide, chlorobenzene, hexane, pentane, cyclohexane, petroleum ether, skelly solve, heptane, acetonitrile, benzonitrile, propionitrile, and the like. Of these, those that are polar in character are generally preferred.

Ordinarily, all that is necessary to practice the sulfonation or sulfation processes of the present invention is that the $SO_3$-complex be brought into physical contact with the sulfonatable or sulfatable material desired to be reacted with the $SO_3$ (from the complex) while the material is preferably in the fluid (generally dissolved in a solvent) state and at a temperature below about $-5°$ C. and preferably below about $-15°$ C. So long as these low temperatures are maintained during the sulfonation or sulfation stage of the process, the desired reaction will generally be obtained. Local undesirable temperature variations within the reaction mixture can be avoided by adding the complex gradually to the solution or dispersion of the sulfonatable or sulfatable material. However, if efficient mixing and cooling is maintained in the reaction mixture, the material can be intermixed with the complex in practically any relative proportions desired, although, generally, it is not necessary to utilize more than about 50 weight percent of the complex (calculated on the basis of the $SO_3$ content of the complex) in excess of the theoretical amount of $SO_3$ required to sulfonate or sulfate the material. It is generally preferred that up to about 5% in excess of this theoretical amount of the complex be utilized, however, when it is desired to achieve optimum yields of sulfonated or sulfated material. No matter in what particular procedure the nitrile-$SO_3$ complexes of this invention are utilized for sulfonation or sulfation, an advantage that can result from its use is that the $SO_3$ contained therein generally reacts in a substantially milder manner than does or would $SO_3$ under otherwise similar conditions, but in the uncomplexed state. The $SO_3$ in the complexes is ordinarily readily available to react in any of its usual ways (except in a milder manner) even though it is in the form of the nitrile-$SO_3$ complex. When one of the complexes of the invention is utilized in any of the sulfonation or sulfation procedures described above, utilization of the $SO_3$ portion of the complex in the sulfonation or sulfation reaction leaves the nitrile portion of the complex substantially unchanged. It will be noted that generally the complexes of this invention are only slightly soluble in the solvent-sulfonatable (or sulfatable) material mixtures. However, the relatively small amount of complex that can be dissolved in these reaction mixtures is ordinarily enough to allow the desired reaction to progress at a satisfactory rate. Because of its relative insolubility, the extent of the desired reaction, particularly in batch processes, can be followed fairly easily by observing the extent of the disappearance of the undissolved $SO_3$-nitrile complex, provided not more than a small amount of the complex in excess of the theoretical amount of $SO_3$ required for the desired reaction is utilized.

In the following examples, which are illustrative of some of the preferred embodiments of the present invention, all parts given are by weight unless otherwise specified.

Example I

Into a glass-lined reaction vessel fitted with an explosion proof stirring motor and a stainless steel impeller type stirrer that is capable of violently agitating the contents of the reaction vessel are charged 500 parts of acetonitrile. The vessel is fitted with a sparge tube which opens just below the outer edge of the impeller. The acetonitrile is cooled to a temperature of $-30°$ C. Then, over a period of 3 hours, 200 parts of $SO_3$ vapor, diluted about 5:1 by volume with dry air, are conducted into the vessel through the sparge tube while the mixture is being agitated intensively and maintained at a temperature below about $-20°$ C. A crystalline precipitate is observed in the reaction vessel, which crystalline precipitate increases in amount as additional $SO_3$ is injected into the cold acetonitrile-complex mixture. After all of the $SO_3$ is added, the mixture is stirred for an additional 15 minutes and then filtered with care to prevent the temperature of the crystals from rising above about $-15°$ C., and to prevent contact of the crystals with moisture. The crystals are about a 1:1 molar complex of acetonitrile and $SO_3$ which complex, upon cold hydrolysis with water, yields sulfuric acid and acetonitrile.

Example II

Into a reaction vessel such as that described in Example I, above, are charged 1,000 parts of benzonitrile and 2,000 parts of carbon tetrachloride. The mixture is then cooled to a temperature of $-20°$ C. While this cold mixture is violently agitated, 600 parts of liquid sulfur trioxide, preblended with 2,000 parts of liquid sulfur dioxide, are added slowly, over a period of about 5 hours, to the nitrile-solvent mixture. During the addition of the $SO_3$–$SO_2$ blend and for about 10 minutes thereafter, the temperature of the reaction mixture is maintained below about $-15°$ C. Also, through a stainless steel filter attached in an insulated recycle system external to the reaction vessel, some of the contents of the reaction vessel are passed continuously during this period of time, at a rate of about 15 percent of the reaction mixture per minute. The $SO_3$-benzonitrile complex is thereby collected as it is formed on the filter.

Example III

Into a cold ($-30°$ C.) solution of 150 parts of sulfur trioxide in 1000 parts of ethylene dichloride are intermixed slowly, over a period of about 2 hours, 350 parts of acetonitrile. During the addition of the acetonitrile, the reaction mixture is stirred vigorously while its temperature is maintained below $-20°$ C. A crystalline precipitate which is about a 1:1 molar complex of sulfur trioxide with acetonitrile forms slowly during said addition.

The complex is subsequently reacted with a sulfatable organic compound such as lauryl alcohol by simply blending the alcohol slowly into the mixture of precipitated $SO_3$-acetonitrile complex and ethylene dichloride while the temperature of the mixture is preferably maintained below about $-15°$ C.

Example IV

Into a stainless steel reaction vessel fitted with a fairly efficient stirrer are charged 2,000 parts of ethylidene dichloride and 100 parts of dodecylbenzene prepared by alkylating benzene with tetrapropylene. The mixture is simultaneously agitated and cooled to a temperature of $-25°$ C. Into this cold mixture are then slowly added, over a period of about 1 hour, 81 parts of a propionitrile-$SO_3$ complex obtained as in Example II, above. The resulting reaction mixture is stirred for an additional 3 hours while its temperature is maintained below about $-20°$ C. After the mixture is warmed to about $50°$ C., the ethylidene dichloride solvent and propionitrile in the mixture are removed via vacuum distillation. The resulting dodecylbenzene sulfonic acid is very light in color and, after being neutralized with NaOH, is an excellent foaming agent and general purpose detergent.

Example V

Into a stainless steel reaction vessel such as that described in Example IV, above, are charged 2,000 parts of methylene chloride and 200 parts of the product resulting from the condensation of nonylphenol with about 5 moles of ethylene oxide (per mole of nonylphenol). The resulting solution is cooled to $-30°$ C. Into this mixture are then slowly added, over a period of about 2 hours, a total of 66 parts of a 1:1 complex of $SO_3$ and propionitrile. Stirring and cooling below about $-25°$ C. are maintained for an additional period of 3 hours. Then the reaction mixture is warmed to about $50°$ C. and a vacuum is applied thereto until substantially all of the methylene chloride solvent and propionitrile have been evaporated therefrom. The residue is then neutralized by being stirred into a stoichiometric amount (based on the acidity of the residue) of 50% aqueous sodium hydroxide. The resulting product, largely sodium nonylphenol+5EO sulfate, contains a surprisingly small amount of sulfonation on the phenol "ring," and is an excellent general purpose surface active agent.

Example VI

Example V is repeated, except that 52 parts of an HCN–$SO_3$ complex is utilized as the sulfating agent. Increasing the temperature to $50°$ C. and applying the vacuum results in the removal of HCN and solvent to practical completion. The product from Example VI is practically identical to that of Example V.

What is claimed is:

1. A complex of sulfur trioxide and a nitrile compound in which the nitrile serves only as a carrier for the sulfur trioxide and from which the sulfur trioxide can be recovered at temperatures below $-5°$ C. in chemically unmodified form, said nitrile being one in which the nitrile group is attached to a hydrocarbon radical containing from one to fifteen carbon atoms, said hydrocarbon radical being selected from the group consisting of saturated and monoethylenically unsaturated aliphatic radicals, alicyclic radicals, monocyclic aryl radicals, and aralkyl radicals.

2. A nitrile-sulfur trioxide complex in accordance with claim 1, the molar ratio of said nitrile to said sulfur trioxide in said complex being about 1:1.

3. A nitrile-sulfur trioxide complex as in claim 2, wherein said nitrile is a lower alkyl nitrile.

4. A complex in accordance with claim 1 of sulfur trioxide and acetonitrile.

5. A complex in accordance with claim 1 of sulfur trioxide and propionitrile.

6. A nitrile-sulfur trioxide complex in accordance with claim 1 wherein said nitrile is a monocyclic hydrocarbyl aromatic nitrile, the hydrocarbyl radical of said nitrile containing not more than ten carbon atoms.

7. A complex in accordance with claim 8 of sulfur trioxide and benzonitrile in a molar ratio of about 1:1, respectively.

8. A process for manufacturing a complex of sulfur trioxide and a nitrile compound, said complex being one in which the nitrile serves only as a carrier for the sulfur trioxide and from which the sulfur trioxide can be recovered at temperatures below −5° C. in chemically unmodified form and said nitrile being one in which the nitrile group is attached to a hydrocarbon radical containing from one to fifteen carbon atoms, said hydrocarbon radical being selected from the group consisting of saturated and monoethylenically unsaturated aliphatic radicals, alicyclic radicals, monocyclic aryl radicals, and aralkyl radicals which process comprises contacting said nitrile compound with sulfur trioxide at a temperature below about −15° C.

9. A process in accordance with claim 8 which comprises forming a solution by dissolving sulfur trioxide in an inert organic solvent and intermixing with said solution said nitrile compound; the temperature of said solution being maintained below about −20° C. during said intermixing.

10. A process which comprises contacting a solution of acetonitrile dissolved in an inert, halogen-substituted lower hydrocarbyl solvent at a temperature below about −20° C. with gaseous sulfur trioxide.

11. In a process for sulfonating an organic compound with sulfur trioxide, the improvement which comprises supplying sulfur trioxide for the sulfonating reaction at a temperature below about −5° C. in the form of a complex of sulfur trioxide with a nitrile compound in which the nitrile serves only as a carrier for the sulfur trioxide and from which the sulfur trioxide can be recovered at temperatures below −5° C. in chemically unmodified form, said nitrile being one in which the nitrile group is attached to a hydrocarbon radical containing from one to fifteen carbon atoms, said hydrocarbon radical being selected from the group consisting of saturated and monoethylenically unsaturated aliphatic radicals, alicyclic radicals, monocyclic aryl radicals, and aralkyl radicals.

12. A process as in claim 11 for sulfonating an alkyl aryl hydrocarbon, which process comprises contacting said hydrocarbon at a temperature below about −20° C. with sulfur trioxide in the form of a complex of said sulfur trioxide with a lower alkyl nitrile.

13. A process as in claim 11 which comprises contacting at a temperature below about −20° C. with a complex of sulfur trioxide and acetonitrile in a molar ratio of about 1:1, an alkylbenzene dissolved in an inert organic solvent which is fluid at said temperature, and which is a polar solvent.

14. A process as in claim 13, wherein said inert solvent is a nonpolar solvent, and said complex is one of sulfur trioxide and propionitrile in a molar ratio of about 1:1.

15. In a process for sulfating an organic compound with sulfur trioxide, the improvement which comprises furnishing at least a portion of said sulfur trioxide to said process by contacting said sulfatable organic compound at a temperature below about −5° C. with a complex of sulfur trioxide and a nitrile in which the nitrile serves only as a carrier for the sulfur trioxide and from which the sulfur trioxide can be recovered at temperatures below −5° C. in chemically unmodified form, said nitrile being one in which the nitrile group is attached to a hydrocarbon radical containing from one to fifteen carbon atoms, said hydrocarbon radical being selected from the group consisting of saturated and monoethylenically unsaturated aliphatic radicals, alicyclic radicals, monocyclic aryl radicals, and aralkyl radicals.

16. An improved process as in claim 15, wherein said contacting is accomplished at a temperature below about −15° C. and said nitrile is an alkyl nitrile containing from 1 to 15 carbon atoms.

17. A process in accordance with claim 15 for sulfating a condensation product of an alkylphenol with a lower alkylene oxide, which process comprises the steps of contacting said condensation product at a temperature below about −15° C. with a complex of sulfur trioxide and a lower alkyl nitrile.

18. In a process in accordance with claim 15 for sulfating an organic alcohol with sulfur trioxide, the improvement which comprises contacting said alcohol at a temperature below about −5° C. with a complex of sulfur trioxide and acetonitrile, said alcohol being dissolved in an inert polar organic solvent during said contacting.

References Cited by the Examiner

UNITED STATES PATENTS

| 2,268,443 | 12/1941 | Crowder | 260—458 X |
| 2,606,202 | 8/1952 | Lecher et al. | 260—458 |
| 2,714,605 | 8/1955 | Jones | 260—458 |
| 2,758,977 | 8/1956 | Knowles et al. | 260—457 X |
| 2,891,962 | 6/1959 | Smith et al. | 260—459 X |
| 2,908,550 | 10/1959 | Hutchings | 23—139 |
| 3,143,552 | 8/1964 | Klass et al. | 260—465.1 X |

FOREIGN PATENTS

| 20,564 | 1/1961 | East Germany. |

OTHER REFERENCES

Eitner: Ber. Deut. Chem., vol. 25, pp. 461–472 (1892).
Eitner: Ber. Deut. Chem., vol. 26, pp. 2833–2839 (1893).

CHARLES B. PARKER, *Primary Examiner.*

JOSEPH P. BRUST, *Examiner.*

F. D. HIGEL, *Assistant Examiner.*